United States Patent [19]

Spainhour et al.

[11] 4,114,283
[45] Sep. 19, 1978

[54] CASTER CAMBER GAUGE

[75] Inventors: Phillip A. Spainhour, Waukegan; Robert S. Hampton, Jr., Skokie; Leonard A. Morrison, Chicago, all of Ill.

[73] Assignee: Ammco Tools, Inc., North Chicago, Ill.

[21] Appl. No.: 765,226

[22] Filed: Feb. 3, 1977

Related U.S. Application Data

[63] Continuation of Ser. No. 619,512, Oct. 3, 1975, abandoned.

[51] Int. Cl.² .................. G01B 5/255; G01B 13/195
[52] U.S. Cl. .................................. 33/337; 33/203.18
[58] Field of Search .............. 33/203.18, 337, 203, 33/336

[56] References Cited

U.S. PATENT DOCUMENTS

| | | | |
|---|---|---|---|
| 2,608,000 | 8/1952 | Castiglia | 33/337 |
| 2,780,875 | 2/1957 | Carr | 33/337 |
| 3,520,064 | 7/1970 | Kushmuk | 33/337 |
| 3,956,830 | 5/1976 | MacMillan | 33/203.18 |

*Primary Examiner*—William D. Martin, Jr.
*Attorney, Agent, or Firm*—Edmond T. Patnaude

[57] ABSTRACT

A caster-camber gauge includes an automatic interlock for presetting the caster and camber wheels, and a spirit level which is laterally mounted for calibration of the gauge.

5 Claims, 5 Drawing Figures

CASTER CAMBER GAUGE

This is a continuation of application Ser. No. 619,512, filed Oct. 3, 1975, now abandoned.

The present invention relates in general to the art of measuring the caster and camber angles of a steerable wheel, and it relates in particular to an improvement of the caster-camber gauge disclosed in U.S. Pat. No. 3,520,064, assigned to the same assignee as the present invention.

BACKGROUND OF THE INVENTION

The gauge disclosed in the said patent is adapted to be mounted in alignment with a wheel spindle and includes a spirit level pivotally mounted on a horizontal axis, a rotatable camber indicating wheel which pivotally adjusts said level, and a coaxial caster indicating wheel used in conjunction with the camber indicating wheel. When using this gauge to measure caster, the serviceman first steers the wheel spindle to a predetermined angular position of say 20° to the right of center and then rotates the camber indicating wheel to set the spirit level in the horizontal position. He then rotates the caster indicating wheel to mutually align a pair of reference points respectively provided on the caster and camber indicating wheels. He then steers the wheel to another angular position of say 20° to the left of center and while holding the caster wheel in the set position he rotates the camber wheel to reset the level in the horizontal position. The caster angle can then be read directly from the caster indicating wheel which is graduated for this purpose.

The angles to which the spindle is steered for the caster measurement is established by the manufacturer, and while this procedure is easily followed when aligning the wheels of most vehicles, in some cases it is very difficult if not impossible to mutually align the reference points on the caster and camber indicating wheels because the reference point on the camber wheel is off to the side or hidden by the housing when the camber wheel has been adjusted to set the level in the horizontal position while the wheel spindle is in the required angular position.

OBJECTS OF THE INVENTION

Therefore, a principal object of the present invention is to provide a new and improved caster-camber gauge which facilitates measuring the caster angle.

Another object of this invention is to provide a caster-camber gauge having a new and improved structure for calibrating the gauge.

SUMMARY OF THE INVENTION

Briefly, in accordance with the teachings of the present invention there is provided a caster-camber gauge in which mutually interlockable means are provided on the caster and camber indicating wheels to facilitate alignment of the respective reference points on the two wheels for the caster measuring operation. In addition, the level housing has the lead screw engaging edge disposed at an angle relative to its pivot axis, and the level housing is mounted for lateral movement along the pivot axis for calibration of the gauge.

BRIEF DESCRIPTION OF THE DRAWING

Further objects and advantages and a better understanding of the present invention can be had by reference to the following detailed description, wherein.

DETAILED DESCRIPTION OF THE INVENTION

Figure 1:
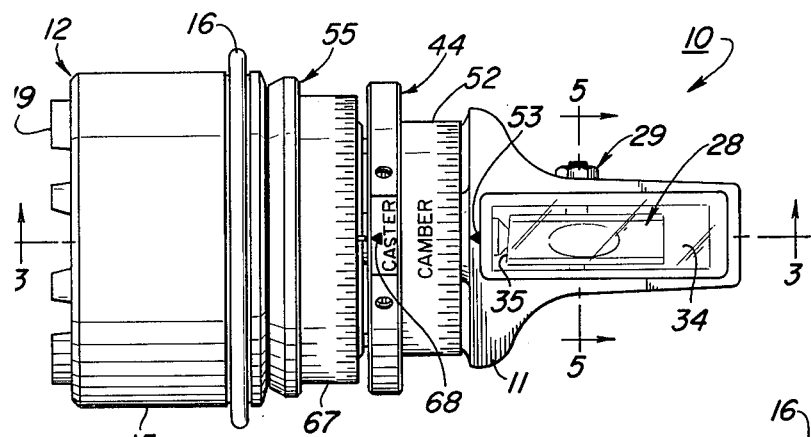
FIG. 1 is a top view of a caster-camber gauge embodying the present invention.

Referring to the drawing, a caster-camber gauge 10 includes a carrier or body member 11 having a magnetic mounting assembly 12 secured thereto by a socket head machine screw 13. The mounting assembly 12 comprises a generally tubular member 15 having an annular external flange 16 received in an arcuate groove 17 in the body member 11. The screw 13 is threaded into a hole 18 in the member 15 to lock the member 15 to the body member 11. An annular permanent magnet 19 is positioned in a counterbore in the end of the member 15 and is held in place by a retainer 21 threaded into an axial hole 22 in the member 15.

The body 11 has an upstanding wall 23 provided with a threaded hole 24 aligned with the hole 22 to receive an actuating screw 25 having a conical end 26. A spirit level 28 is pivotally mounted on a pivot pin 29 in a recess 30 in the body member 11. A spring 31 mounted in a hole 32 below a lift pin 33 lifts the outer end of the level 28 to urge the lower inner edge 35 downwardly against the conical surface of the actuating screw 25. A transparent window 34 covers the recess 30 for protection of the level 28 and the associated mounting assembly.

Figure 5:
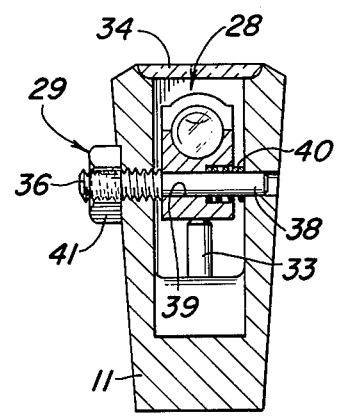
FIG. 5 is a sectional view taken along the line 5—5 of FIG. 1.
Figure 3:
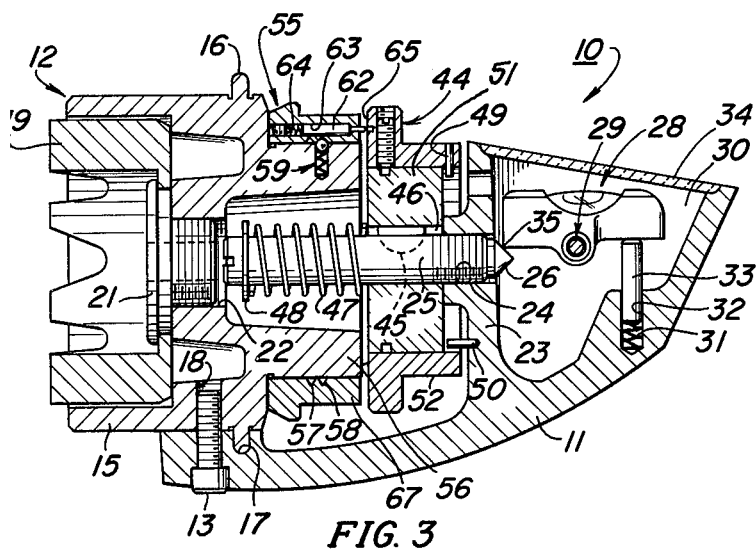
FIG. 3 is a sectional view taken along the line 3—3 of FIG. 1.

In order to permit calibration of the gauge, the lower inner edge 35 of the level extends at an angle relative to the axis of the pivot pin 29, and the level is adjustably movable along the pin 29. As best shown in FIG. 5, the pivot pin 29 has a threaded end portion 36 threadedly received in a hole 37 in the body member 11 and a shank portion 38 slidably received in a hole 39 in the level 28. The hole 39 is counterbored to receive a coil 40 which urges the level into engagement with the shoulder provided at the juncture between the threshold portion 36 and the smooth shank portion 38. A locking nut 41 is provided to lock the pivot pin 29 in the adjusted position. It may thus be seen that as the level 28 is moved laterally along its pivot axis the distance between the edge 35 and the actuating screw 25 is varied. This calibration adjustment is thus easily made by loosening the nut 41 and adjusting the screw 36, yet the gauge remains calibrated in spite of rough handling.

A camber indicating wheel assembly 44 is adjustably mounted on a ring 51 which is keyed to the actuating screw 25 by a Woodruff key 45 positioned in an axial slot 46 in the ring 51. A coil spring 47 is compressed between the inner side of the wheel assembly 44 and a split ring 48 fixed to the actuating screw 25 to bias the wheel assembly against the wall 23 of the body member 11. The camber wheel 44 and the actuating screw 25 thus rotate in unison. A pair of stop pins 49 and 50 respectively provided on the camber wheel 44 and the body member 11 limit the rotation of the camber wheel 44 to slightly less than 360°. The camber wheel 44 has a cylindrical outer surface 52 which is graduated in degrees of camber for direct reading in conjunction with a reference mark 53 located on the top of the wall portion 23 of the body member 11.

A caster indicating wheel 55 is mounted on a cylindrical surface of the member 15 for coaxial rotation with the camber wheel 44. The caster wheel 55 is provided with a pair of internal annular grooves 57 and 58 which in conjunction with a ball and spring detent 59 mounted in the member 15 hold the wheel 55 in either of two axial position while permitting rotation of the wheel in both positions.

Figure 4:
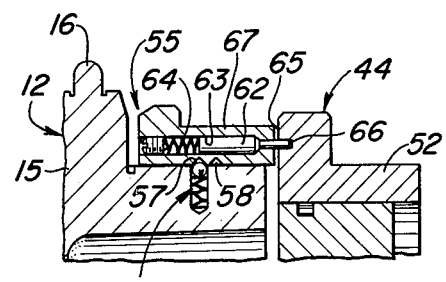
FIG. 4 is a fragmentary sectional view showing the camber and caster indicating wheels in an interlocked condition.
Figure 2:
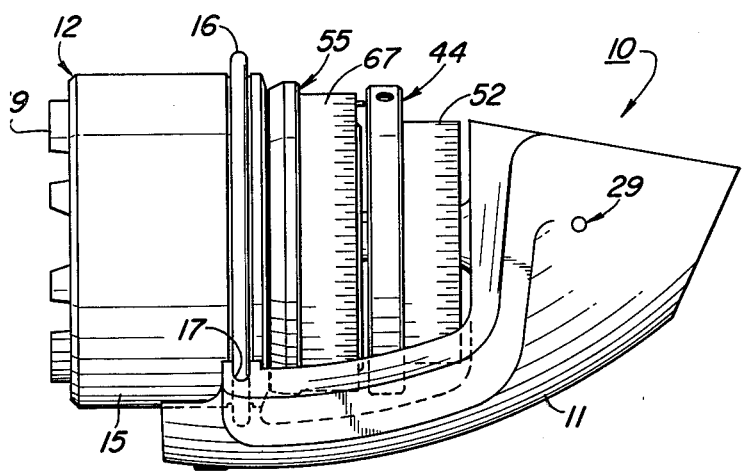
FIG. 2 is an elevational view of the gauge of FIG. 1.

In order to permit the serviceman to mutually interlock the caster and camber wheels for making a caster angle measurement, a first interlockable means in the form of a locking pin 62 is slidably mounted in a hole 63 in the caster wheel 55. A spring 64 is mounted behind the pin 62 to bias it toward the inner face 65 of the camber wheel 44. When the caster wheel 55 is in the outer position as shown in FIG. 4 the end of the locking pin 62 can extend into the hole 66 in the inner face 65 of the camber wheel. The hole 66 thus provides a second interlockable means. The pin 62 and the hole 66 are positioned so as to be in mutual alignment when the caster reference point or arrow 68 on the camber wheel is opposite the zero reference point on the graduated cylindrical surface 67 on the caster wheel. Since the locking pin is spring biased, the caster and camber wheels can be interlocked at the reference position simply by pulling the caster wheel 55 out toward the camber wheel and then rotating it until the pin 62 snaps into the hole 66 whereby the first and second interlockable means become mutually interlocked. Visual alignment of the arrow 68 with the zero position on the caster wheel is thus obviated. The wheels are released from one another by pushing the caster wheel away from the camber wheel whereby the shoulder on the locking pin bottoms in the mounting hole 63 out of engagement with the camber wheel.

OPERATION

When using the gauge 10 to measure caster and camber of a wheel, the serviceman initially mounts the gauge on the end of the wheel bearing or on a suitable mounting attachment clamped to the wheel itself. The gauge is oriented so that the reference mark 53 is at the top. With the wheels of the vehicle in the straight ahead position the camber wheel 44 is rotatably adjusted to center the bubble in the spirit level 28. The angle indicated on the camber dial opposite the reference mark 53 is the camber angle of the wheel.

In order to measure the caster angle of the wheel, the wheel is turned in to a predetermined angle of, for example, twenty degrees. The camber wheel is again rotated to center the bubble in the level 28. The caster wheel is then pulled outwardly into the position shown in FIG. 4 and turned until the locking pin 62 snaps into the hole 66. If desired, the caster and camber wheels can be locked together before the camber wheel is rotated to set the level 28 in the horizontal position. In either case, once the level has been set and the caster wheel indexed relative to the camber wheel, the caster wheel is pushed into the inner position to release it from the camber wheel. The vehicle wheel is then turned outwardly to the same angular position relative to the straight ahead position and the camber wheel is again rotated to set the level 78 in the horizontal positon. The caster reference mark 68 on the camber wheel then points to the position on the caster dial 67 indicating the caster angle of the wheel. Although the interlock feature of the gauge 10 is particularly useful for those situations where the reference mark 68 is difficult to see, it enables the serviceman in all cases to more quickly and accurately set the caster wheel to the indexed position for the caster measurement, reducing the time required to make the caster measurement and assuring an accurate reading.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this intention.

What is claimed:

1. An instrument for measuring the camber and caster angles of a steerable wheel, comprising
    a carrier for attachment to said steerable wheel,
    a spirit level mounted to said carrier for pivotal movement about a horizontal axis,
    a camber indicating wheel rotatably carried by said carrier for pivotally adjusting said level and for indicating the angle of incidence between the axis of said steerable wheel and the horizontal,
    a caster indicating wheel carried by said carrier for coaxial rotation with said camber indicating wheel for indicating the caster of said steerable wheel,
    first indicating wheel interlockable means carried at a fixed position on said camber indicating wheel,
    second indicating wheel interlockable means carried at a fixed position on said caster indicating wheel, and
    said first and second interlockable means being movable into mutual interlocking relationship only when said indicating wheels are in one relative angular position wherein said fixed positions are mutually adjacent.

2. An instrument according to claim 1 wherein
    said indicating wheels are relatively movable in an axial direction for manual setting thereof in interlocking and non-interlocking conditions.

3. An instrument according to claim 2 wherein said interlockable means comprises
    an opening in one of said indicating wheels, and
    means carried by the other of said indicating wheels and resiliently biased toward said one indicating wheel for receipt in said opening.

4. An instrument according to claim 1 comprising
    a screw threadedly received in said carrier and connected to said camber indicating wheel for rotation thereby,
    said screw having a conical end, and
    spring means biasing one edge of said level against said conical end.

5. An instrument according to claim 4 wherein
    said one edge of said level is disposed at an angle relative to the axis of said screw, and
    calibrating means for adjusting the position of said level along the pivot axis thereof.

* * * * *